United States Patent
Wu

(10) Patent No.: US 11,640,201 B2
(45) Date of Patent: May 2, 2023

(54) VIRTUAL REALITY-BASED EYEBALL TRACKING METHOD AND SYSTEM

(71) Applicant: QINGDAO PICO TECHNOLOGY CO., LTD., Qingdao (CN)

(72) Inventor: Tao Wu, Shandong (CN)

(73) Assignee: QINGDAO PICO TECHNOLOGY CO., LTD., Qingdao (CN)

( * ) Notice: Subject to any disclaimer, the term of this patent is extended or adjusted under 35 U.S.C. 154(b) by 0 days.

(21) Appl. No.: 17/878,023

(22) Filed: Jul. 31, 2022

(65) Prior Publication Data

US 2022/0374076 A1 Nov. 24, 2022

Related U.S. Application Data

(63) Continuation of application No. PCT/CN2021/118285, filed on Sep. 14, 2021.

(30) Foreign Application Priority Data

Mar. 30, 2021 (CN) .......................... 202110340595.5

(51) Int. Cl.
*G06F 3/01* (2006.01)
*G06T 7/70* (2017.01)
(Continued)

(52) U.S. Cl.
CPC ................ *G06F 3/013* (2013.01); *G06T 7/70* (2017.01); *G06T 2207/10048* (2013.01);
(Continued)

(58) Field of Classification Search
CPC ............. G06T 7/70; G06T 2207/30201; G06T 2207/10048; G06F 3/013; H04N 5/2256; H04N 5/2354
See application file for complete search history.

(56) References Cited

U.S. PATENT DOCUMENTS 10,990,172 B2 * 4/2021 Kim ........................ G02B 6/005
11,143,869 B2 * 10/2021 Liu ..................... G02B 27/0172
(Continued)

FOREIGN PATENT DOCUMENTS

CN 104834381 A 8/2015
CN 106598260 A 4/2017
(Continued)

OTHER PUBLICATIONS

Search Report dated Jan. 4, 2022 for PCT Application No. PCT/CN2021/118285.
(Continued)

*Primary Examiner* — Vinh T Lam

(57) ABSTRACT

A virtual reality-based eyeball tracking method and system are provided. Eyeball calibration data is presented to eyes of a user through a display, and then a binocular pupillary distance of the user is obtained through the eyeball calibration data. A left tracking camera captures reflected infrared light of a turned on left infrared light source, and a right tracking camera captures reflected infrared light of a turned on right infrared light source, so that tracking data of one eye is formed in each specific frame. Tracking data of the other eye in the specific frame is calculated according to the binocular pupillary distance and the tracking data of one eye. The tracking data of one eye and the tracking data of the other eye are arranged according to a time sequence of the specific frame to form binocular tracking data so as to complete eyeball tracking.

20 Claims, 2 Drawing Sheets

(51) Int. Cl.
  *H04N 5/225*  (2006.01)
  *H04N 5/235*  (2006.01)
  *H04N 23/56*  (2023.01)
  *H04N 23/74*  (2023.01)
(52) U.S. Cl.
  CPC .... *G06T 2207/30201* (2013.01); *H04N 23/56* (2023.01); *H04N 23/74* (2023.01)

(56) References Cited

U.S. PATENT DOCUMENTS

| | | | |
|---|---|---|---|
| 11,238,616 B1 * | 2/2022 | Sethi | G06T 7/85 |
| 11,475,641 B2 * | 10/2022 | Price | G06T 19/006 |
| 11,488,316 B2 * | 11/2022 | Yoon | G01B 11/2513 |
| 2015/0278576 A1 | 10/2015 | Horesh et al. | |
| 2017/0008374 A1 | 1/2017 | Stannard et al. | |
| 2017/0123526 A1 | 5/2017 | Trail et al. | |
| 2017/0180720 A1 | 6/2017 | Jarc | |

FOREIGN PATENT DOCUMENTS

| | | | |
|---|---|---|---|
| CN | 106659541 A | 5/2017 | |
| CN | 106768361 A | 5/2017 | |
| CN | 108351514 A | 7/2018 | |
| CN | 207650482 U | 7/2018 | |
| CN | 109542240 A | 3/2019 | |
| CN | 108351514 B * | 11/2019 | ............ A61B 3/113 |
| CN | 110502100 A | 11/2019 | |
| CN | 112099615 A | 12/2020 | |
| CN | 112926521 A | 6/2021 | |
| CN | 112926523 A | 6/2021 | |
| DE | 102015223891 A1 * | 3/2017 | ........... A61B 3/0025 |
| EP | 3215914 A1 | 9/2017 | |
| EP | 2857939 B1 * | 8/2018 | ............ A61B 3/111 |
| EP | 3369365 A1 * | 9/2018 | ............ A61B 3/103 |
| JP | 6083761 B2 * | 2/2017 | ............ A61B 3/111 |
| KR | 20170034681 A | 3/2017 | |
| WO | WO2016073131 A1 | 5/2016 | |
| WO | 2018093102 A1 | 5/2018 | |

OTHER PUBLICATIONS

Jones, J. A., et al., "The Effect of Eye Position on the View of Virtual Geometry," IEEE Virtual Reality 2014, Mar. 29-Apr. 2, Minneapolis, Minnesota.

Chang, Xu, "The Influence of Shape Ratio on Efficiency of Movement Task in Virtual Reality," China Excellent doctoral and master's dissertation Full text Database (Master) Information Technology Series, Jun. 15, 2019, pp. 1-60, with English Abstract (61 pages).

Notification to Grant Patent Right dated Jun. 28, 2022 in Chinese Application No. 202110340595.5, with English translation (8 pages).

Iskander, J., et al., "Using biomechanics to investigate the effect of VR on eye vergence system," Applied Ergonomics 81 (2019), pp. 1-8, Jul. 3, 2019.

Hickson, S., et al., "Eyemotion: Classifying Facial Expressions in VR Using Eye-Tracking Cameras," 2019 IEEE Winter Conference on Applications of Computer Vision, pp. 1-10, Jul. 28, 2017.

\* cited by examiner

VIRTUAL REALITY-BASED EYEBALL TRACKING METHOD AND SYSTEM

CROSS REFERENCE

This application is a continuation of PCT International Application No. PCT/CN2021/118285 filed on Sep. 14, 2021, which claims priority to Chinese Application No. 202110340595.5 filed with China National Intellectual Property Administration on Mar. 30, 2021, the entirety of which is herein incorporated by reference.

TECHNICAL FIELD

The present disclosure relates to the technical field of virtual reality, and in particular to a virtual reality-based eyeball tracking method and system.

BACKGROUND

With the progress of science and technology and the diversified development of market demands, virtual reality systems are becoming more and more popular and have been applied in many fields, such as computer games, health and safety, industrial and educational training. As a few examples, mixed virtual reality systems are being integrated into various aspects of life such as mobile communication devices, gaming machines, personal computers, movie theaters, theme parks, university laboratories, student classrooms, and hospital exercise rooms.

In general, virtual reality is a form of reality that is adjusted in some manner prior to being presented to a user, and may include Virtual Reality (VR), Augmented Reality (AR), Mixed Reality (MR), or some combinations and/or derivative combinations thereof.

Atypical virtual reality system includes one or more devices configured to present and display content to a user. For example, a virtual reality system may include a Head Mounted Display (HMD) worn by a user and configured to output virtual reality content to the user. At present, a virtual reality system configured as an integrated device is popular. That is, various hardware devices such as a mobile computing processing unit and an image graphic renderer are integrated in the integrated device. At present, the integrated virtual reality device is applied and popularized in many fields and scenarios, the requirements on quality parameters such as image definition of rendered contents presented by the integrated virtual reality device in some scenarios are relatively high, and large challenges are brought to the processing capability and rendering capability of a mobile end of the integrated virtual reality device.

According to an eyeball tracking technology in the related art, two eyeball tracking modules are respectively provided on left and right eye positions of a screen of an integrated virtual reality device, and adopting the same light source in the two eyeball tracking modules. As a result, when in calibration or use, light rays emitted by the light sources in the two eyeball tracking modules are likely to interfere with each other, especially for a user wearing myopia glasses, calculation result errors are increased, and the position accuracy of eyeball tracking is influenced.

Therefore, there is a need for a virtual reality-based eyeball tracking method and system, which can effectively avoid the problem that light sources of two eyeball tracking modules are likely to interfere with each other in calibration or use and can improve the tracking accuracy and stability.

SUMMARY

Embodiments of the present disclosure provide a virtual reality-based eyeball tracking method and system, which can solve the problems that since two eyeball tracking modules are respectively provided on left and right eye positions of a screen of an integrated virtual reality device and the same light source is arranged in the two eyeball tracking modules, when in calibration or use, light rays emitted by the light sources in the two eyeball tracking modules are likely to interfere with each other, especially for a user wearing myopia glasses, calculation result errors are increased, and the position accuracy of eyeball tracking is influenced.

The embodiments of the present disclosure provide a virtual reality-based eyeball tracking method, which includes:

presenting eyeball calibration data to eyes of a user through a display;

obtaining a binocular pupillary distance of the user through the eyeball calibration data;

capturing reflected infrared light of a turned on left infrared light source through a left tracking camera and capturing reflected infrared light of a turned on right infrared light source through a right tracking camera to form tracking data of one eye in each specific frame, and calculating tracking data of the other eye in the specific frame according to the binocular pupillary distance and the tracking data of one eye, wherein only one of the left infrared light source and the right infrared light source is turned on in the same specific frame; and arranging the tracking data of one eye and the tracking data of the other eye according to a time sequence of the specific frame to form binocular tracking data so as to complete eyeball tracking.

In some exemplary embodiments, obtaining a binocular pupillary distance of the user through the eyeball calibration data includes:

capturing, through a camera, an action of adjusting the eyes by the user according to the calibration data to obtain a user calibration image; and positioning and analyzing the user calibration image to obtain a distance between centroids of the eyes of the user so as to generate the binocular pupillary distance.

In some exemplary embodiments, obtaining a binocular pupillary distance of the user through the eyeball calibration data includes:

capturing, through the left tracking camera, an action of adjusting a left eye by the user according to the eyeball calibration data to form left eye calibration data, and capturing, through the right tracking camera, an action of adjusting a right eye by the user according to the eyeball calibration data to form right eye calibration data; and fitting the left eye calibration data and the right eye calibration data according to a relative position relationship between the left tracking camera and the right tracking camera to obtain a distance between centroids of the eyes of the user so as to generate the binocular pupillary distance.

In some exemplary embodiments, capturing reflected infrared light of a turned on left infrared light source through a left tracking camera and capturing reflected infrared light of a turned on right infrared light source through a right tracking camera to form tracking data of one eye in each specific frame includes:

controlling the left infrared light source and the right infrared light source to respectively emit infrared light to a left eye and a right eye of the user, so that the infrared light form reflected infrared light in the left eye and the right eye of the user; and sequentially capturing the reflected infrared light according to a sequence of each specific frame and forming the tracking data of one eye in each specific frame according to a relative position of the reflected infrared light through a computer vision technology.

In some exemplary embodiments, the left infrared light source and the right infrared light source are sequentially and alternately turned on according to odd or even frame numbers of respective specific frames.

The embodiments of the present disclosure also provide a virtual reality-based eyeball tracking system, configured to implement the foregoing virtual reality-based eyeball tracking method. The system includes a display arranged in an integrated virtual reality device, a processor, monocular tracking modules and infrared light sources arranged in the integrated virtual reality device. The processor includes a pupillary distance obtaining module and a tracking calculation module. The monocular tracking modules include a left tracking camera and a right tracking camera. The infrared light sources include a left infrared light source and a right infrared light source.

The display is configured to present eyeball calibration data to eyes of a user.

The pupillary distance obtaining module is configured to obtain a binocular pupillary distance of the user.

The left tracking camera is configured to capture reflected infrared light of a turned on left infrared light source, and the right tracking camera is configured to capture reflected infrared light of a turned on right infrared light source to form tracking data of one eye in each specific frame. Only one of the left infrared light source and the right infrared light source is turned on in the same specific frame.

The tracking calculation module is configured to calculate tracking data of the other eye in the specific frame according to the binocular pupillary distance and the tracking data of one eye, and further configured to arrange the tracking data of one eye and the tracking data of the other eye according to a time sequence of the specific frame to form binocular tracking data so as to complete eyeball tracking.

In some exemplary embodiments, the left tracking camera and the right tracking camera are arranged at positions corresponding to a left eye and a right eye of the user in the integrated virtual reality device.

The left infrared light source and the right infrared light source are respectively arranged on the periphery of the left tracking camera and the right tracking camera.

In some exemplary embodiments, the left tracking camera is further configured to capture an action of adjusting the left eye by the user according to the eyeball calibration data to form left eye calibration data, and the right tracking camera is further configured to capture an action of adjusting the right eye by the user according to the eyeball calibration data to form right eye calibration data, so that the pupillary distance obtaining module is configured to obtain the left eye calibration data and the right eye calibration data and fit the left eye calibration data and the right eye calibration data according to a relative position relationship between the left tracking camera and the right tracking camera to obtain a distance between centroids of the eyes of the user so as to generate the binocular pupillary distance.

In some exemplary embodiments, the system further includes a camera.

The camera is configured to capture an action of adjusting the eyes by the user according to the calibration data to obtain a user calibration image, so that the pupillary distance obtaining module is configured to position and analyze the user calibration image to obtain a distance between centroids of the eyes of the user so as to generate the binocular pupillary distance.

In some exemplary embodiments, the left tracking camera and the right tracking camera have a capturing frame rate of 60 Hz.

As can be concluded from the above technical solution, according to the virtual reality-based eyeball tracking method and system provided by the embodiments of the present disclosure, eyeball calibration data is presented to eyes of a user through a display, and then a binocular pupillary distance of the user is obtained through the eyeball calibration data. A left tracking camera captures reflected infrared light of a turned on left infrared light source, and a right tracking camera captures reflected infrared light of a turned on right infrared light source, so that tracking data of one eye is formed in each specific frame. Tracking data of the other eye in the specific frame is calculated according to the binocular pupillary distance and the tracking data of one eye. Only one of the left infrared light source and the right infrared light source is turned on in the same specific frame. The tracking data of one eye and the tracking data of the other eye are arranged according to a time sequence of the specific frame to form binocular tracking data so as to complete eyeball tracking. Since only one of the left infrared light source and the right infrared light source is turned on in the same specific frame, mutual interference does not exist, and the problems that light rays emitted by light sources in binocular eyeball tracking easily interfere with each other, calculation result errors are large and the position accuracy of eyeball tracking is influenced can be solved.

BRIEF DESCRIPTION OF THE DRAWINGS

Other objects and results of the embodiments of the present disclosure will become more apparent and more easily understood by reference to the following description taken in conjunction with the accompanying drawings, and as the embodiments of the disclosure become more fully understood. In the drawings.

DETAILED DESCRIPTION OF THE EMBODIMENTS

Two eyeball tracking modules are respectively provided on left and right eye positions of a screen of an integrated virtual reality device, and the same light sources are arranged in the two eyeball tracking modules. As a result, when in calibration or use, light rays emitted by the light sources in the two eyeball tracking modules are likely to interfere with each other, especially for a user wearing myopia glasses, calculation result errors are increased, and the position accuracy of eyeball tracking is influenced.

The embodiments of the present disclosure provide a virtual reality-based eyeball tracking method and system. Exemplary embodiments of the present disclosure are described in detail below with reference to the accompanying drawings.

Figure 1:
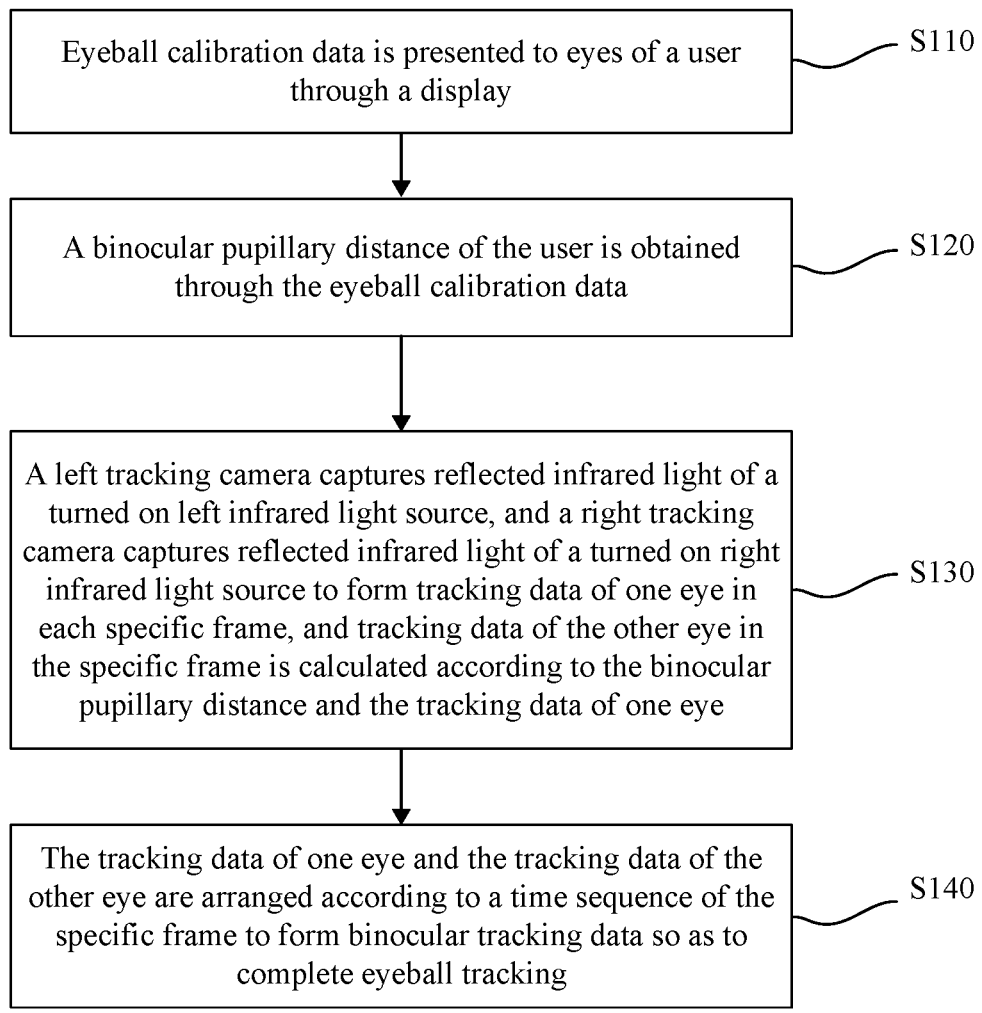
FIG. 1 is a flowchart of a virtual reality-based eyeball tracking method according to some embodiments of the present disclosure.
Figure 2:
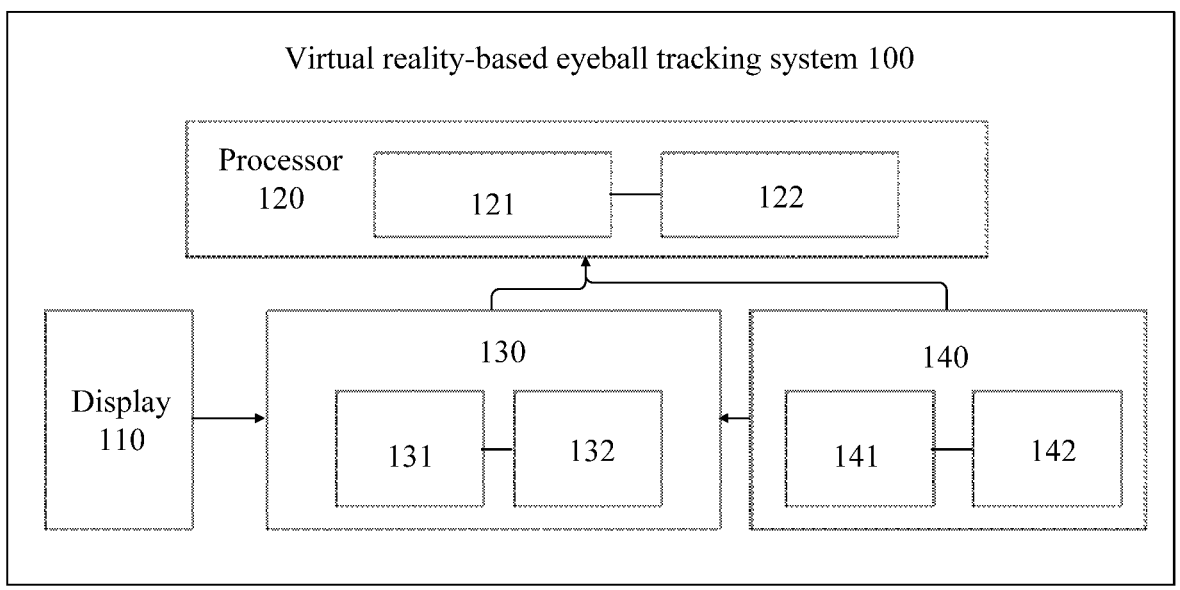
FIG. 2 is a schematic diagram of a virtual reality-based eyeball tracking system according to some embodiments of the present disclosure.

In order to illustrate the virtual reality-based eyeball tracking method provided by the embodiments of the present disclosure, FIG. 1 exemplarily illustrates a virtual reality-based eyeball tracking method according to some embodiments of the present disclosure, and FIG. 2 exemplarily illustrates a virtual reality-based eyeball tracking system according to some embodiments of the present disclosure.

The following description of exemplary embodiments is only illustrative, and is not used as any limitation for the present disclosure and the application or use thereof. Technologies and devices known by those having ordinary skill in the related art may not be discussed in detail. However, where appropriate, the technologies and the devices shall be regarded as part of the description.

As shown in FIG. 1, the virtual reality-based eyeball tracking method provided by the embodiments of the present disclosure includes the following operations.

At S110, eyeball calibration data is presented to eyes of a user through a display.

At S120, a binocular pupillary distance of the user is obtained through the eyeball calibration data.

At S130, a left tracking camera captures reflected infrared light of a turned on left infrared light source, and a right tracking camera captures reflected infrared light of a turned on right infrared light source to form tracking data of one eye in each specific frame, and tracking data of the other eye in the specific frame is calculated according to the binocular pupillary distance and the tracking data of one eye. Only one of the left infrared light source and the right infrared light source is turned on in the same specific frame.

At S140, the tracking data of one eye and the tracking data of the other eye are arranged according to a time sequence of the specific frame to form binocular tracking data so as to complete eyeball tracking.

As shown in FIG. 1, the process of obtaining a binocular pupillary distance of the user through the eyeball calibration data in operation S120 may include the following operations.

At S1-121, a camera captures an action of adjusting the eyes by the user according to the calibration data to obtain a user calibration image.

At S1-122, the user calibration image is positioned and analyzed to obtain a distance between centroids of the eyes of the user so as to generate the binocular pupillary distance.

As shown in FIG. 1, the process of obtaining a binocular pupillary distance of the user through the eyeball calibration data in operation S120 may alternatively or further include the following operations.

At S2-121, the left tracking camera captures an action of adjusting a left eye by the user according to the eyeball calibration data to form left eye calibration data, and the right tracking camera captures an action of adjusting a right eye by the user according to the eyeball calibration data to form right eye calibration data.

At S2-122, the left eye calibration data and the right eye calibration data are fitted according to a relative position relationship between the left tracking camera and the right tracking camera to obtain a distance between centroids of the eyes of the user so as to generate the binocular pupillary distance.

As shown in FIG. 1, the process of capturing reflected infrared light of a turned on left infrared light source through a left tracking camera and capturing reflected infrared light of a turned on right infrared light source through a right tracking camera to form tracking data of one eye in each specific frame in operation S130 includes the following operations.

At S131, the left infrared light source and the right infrared light source are controlled to respectively emit infrared light to a left eye and a right eye of the user, so that the infrared light form reflected infrared light in the left eye and the right eye of the user.

At S132, the reflected infrared light is sequentially captured according to a sequence of each specific frame and tracking data of one eye is formed in each specific frame according to a relative position of the reflected infrared light through a computer vision technology.

In the embodiments shown in FIG. 1, operation S130 includes: capturing reflected infrared light of a turned on left infrared light source through a left tracking camera and capturing reflected infrared light of a turned on right infrared light source through a right tracking camera to form the tracking data of one eye in each specific frame, and calculating tracking data of the other eye in the specific frame according to the binocular pupillary distance and the tracking data of one eye. Only one of the left infrared light source and the right infrared light source is turned on in the same specific frame. For example, only the left infrared light source is turned on all the time in the whole process of operation S130, or only the right infrared light source is turned on all the time in the whole process of operation S130, or the left infrared light source and the right infrared light source are turned on alternately and randomly in the whole process of operation S130. In the embodiments, the left infrared light source and the right infrared light source are alternately turned on in sequence according to odd or even frame numbers of respective specific frames. For example, the left infrared light source is firstly turned on. That is, in the first frame, the left infrared light source is turned on, and in the second frame, the right infrared light source is turned on. In other words, in the embodiments, the left infrared light source is turned on in odd numbers of specific frames, and the right infrared light source is turned on in even numbers of specific frames. When one infrared light source is on, the other infrared light source needs to be turned off. As an exemplary implementation, when the left infrared light source is turned on, the left tracking camera captures reflected infrared light in a left eyeball of a user to obtain left eye tracking data. At this moment, the right infrared light source is turned off, and the right tracking camera corresponding to the right infrared light source may capture or not capture an image. Even if the right infrared light source captures an image, the captured image cannot be clear and cannot serve as a reference even if the right infrared light source captures the image at the same time when the left tracking camera captures reflected infrared light. However, although no reflected infrared light of the right infrared light source can be captured in the specific frame (an odd frame in the embodiment), tracking data of the other eye (the right eye in the embodiment) in the specific frame (the odd frame of the embodiment) can be calculated according to the binocular pupillary distance and the tracking data of one eye (tracking data of the left eye in the embodiments) obtained in operation S120, thereby obtaining the tracking data of the left eye and the right eye in the specific frame.

As shown in FIG. 1, operation S140 includes arranging the tracking data of one eye and the tracking data of the other eye according to a time sequence of the specific frame to form binocular tracking data so as to complete eyeball tracking. After obtaining the tracking data of the left eye and the tracking data of the right eye in the specific frame in operation S130, the tracking data of the left eye and the tracking data of the right eye are sequentially arranged in a sequence of a first frame, a second frame, and a third frame to form binocular tracking data so as to complete eyeball tracking.

As described above, according to the virtual reality-based eyeball tracking method provided by the embodiments of the present disclosure, eyeball calibration data is presented to eyes of a user through a display, and then a binocular pupillary distance of the user is obtained through the eyeball calibration data. A left tracking camera captures reflected infrared light of a turned on left infrared light source, and a right tracking camera captures reflected infrared light of a turned on right infrared light source, so that tracking data of one eye is formed in each specific frame. Tracking data of the other eye in the specific frame is calculated according to the binocular pupillary distance and the tracking data of one eye. Only one of the left infrared light source and the right infrared light source is turned on in the same specific frame. The tracking data of one eye and the tracking data of the other eye are arranged according to a time sequence of the specific frame to form binocular tracking data so as to complete eyeball tracking. Since only one of the left infrared light source and the right infrared light source is turned on in the same specific frame, mutual interference does not exist, and the problems that light rays emitted by light sources in binocular eyeball tracking easily interfere with each other, calculation result errors are large and the position accuracy of eyeball tracking is influenced can be solved.

As shown in FIG. 2, the embodiments of the present disclosure also provide a virtual reality-based eyeball tracking system 100, configured to implement the foregoing virtual reality-based eyeball tracking method. The system includes a display 110 arranged in an integrated virtual reality device, a processor 120, monocular tracking modules 130, and infrared light sources 140 arranged in the integrated virtual reality device. The processor 120 includes a pupillary distance obtaining module 121 and a tracking calculation module 122. The monocular tracking modules 130 include a left tracking camera 131 and a right tracking camera 132. The infrared light sources 140 include a left infrared light source 141 and a right infrared light source 142.

The display 110 is configured to present eyeball calibration data to eyes of a user.

The pupillary distance obtaining module 121 is configured to obtain a binocular pupillary distance of the user.

The left tracking camera 131 is configured to capture reflected infrared light of a turned on left infrared light source 141, and the right tracking camera 132 is configured to capture reflected infrared light of a turned on right infrared light source 142, so as to form tracking data of one eye in each specific frame. Only one of the left infrared light source 141 and the right infrared light source 142 is turned on in the same specific frame.

The tracking calculation module 122 is configured to calculate tracking data of the other eye in the specific frame according to the binocular pupillary distance and the tracking data of one eye, and further configured to arrange the tracking data of one eye and the tracking data of the other eye according to a time sequence of the specific frame to form binocular tracking data so as to complete eyeball tracking.

In the embodiment shown in FIG. 2, the positions of the left tracking camera 131 and the right tracking camera 132 are not particularly limited. In the embodiments, the left tracking camera 131 and the right tracking camera 132 are arranged at positions corresponding to a left eye and a right eye of the user in the integrated virtual reality device. The left infrared light source 141 and the right infrared light source 142 are respectively arranged on the periphery of the left tracking camera 131 and the right tracking camera 132.

In an exemplary embodiment, the left tracking camera 131 is further configured to capture an action of adjusting the left eye by the user according to the eyeball calibration data to form left eye calibration data, and the right tracking camera 132 is further configured to capture an action of adjusting the right eye by the user according to the eyeball calibration data to form right eye calibration data, so that the pupillary distance obtaining module 121 is configured to obtain the left eye calibration data and the right eye calibration data and fit the left eye calibration data and the right eye calibration data according to a relative position relationship between the left tracking camera and the right tracking camera to obtain a distance between centroids of the eyes of the user so as to generate the binocular pupillary distance.

In another exemplary embodiment, the virtual reality-based eyeball tracking system as shown in FIG. 2 further includes a camera (not shown). The camera is configured to capture an action of adjusting the eyes by the user according to the calibration data to obtain a user calibration image, so that the pupillary distance obtaining module 121 is configured to position and analyze the user calibration image to obtain a distance between centroids of the eyes of the user so as to generate the binocular pupillary distance, and then calculates tracking data of the other eye in the specific frame according to the binocular pupillary distance and the tracking data of one eye to complete eyeball tracking.

As can be concluded from the above implementations, according to the virtual reality-based eyeball tracking method and system provided by the embodiments of the present disclosure, eyeball calibration data is presented to eyes of a user through a display, and then a binocular pupillary distance of the user is obtained through the eyeball calibration data. A left tracking camera captures reflected infrared light of a turned on left infrared light source, and a right tracking camera captures reflected infrared light of a turned on right infrared light source, so that tracking data of one eye is formed in each specific frame. Tracking data of the other eye in the specific frame is calculated according to the binocular pupillary distance and the tracking data of one eye. Only one of the left infrared light source and the right infrared light source is turned on in the same specific frame. The tracking data of one eye and the tracking data of the other eye are arranged according to a time sequence of the specific frame to form binocular tracking data so as to complete eyeball tracking. Since only one of the left infrared light source and the right infrared light source is turned on in the same specific frame, mutual interference does not exist, and the problems that light rays emitted by light sources in binocular eyeball tracking easily interfere with each other, calculation result errors are large and the position accuracy of eyeball tracking is influenced can be solved.

The virtual reality-based eyeball tracking method and system proposed in the embodiments of the present disclosure are described above by way of example with reference to the accompanying drawings. However, those having ordinary skill in the art should understand that various improvements can be made to the virtual reality-based eyeball tracking method and system proposed in the embodiments of the present disclosure, without departing from the content of the present disclosure. Therefore, the scope of protection of the present disclosure should be determined by the content of the appended claims.

Specific examples of the embodiments may refer to the examples described in the above embodiments and exemplary implementations, and details are not described herein in the embodiments.

It is apparent that those having ordinary skill in the art should understand that the above modules or operations of the embodiments of the present disclosure may be implemented by a general-purpose computing device, and may be centralized on a single computing device or distributed on a network composed of multiple computing devices. They may be implemented with program codes executable by a computing device, so that they may be stored in a storage device and executed by the computing device, and in some cases, the operations shown or described may be performed in a different order than here, or they are separately made into individual integrated circuit modules, or multiple modules or operations therein are made into a single integrated circuit module for implementation. As such, the present disclosure is not limited to any particular combination of hardware and software.

The above is only the exemplary embodiments of the present disclosure, not intended to limit the present disclosure. As will occur to those having ordinary skill in the art, the present disclosure is susceptible to various modifications and changes. Any modifications, equivalent replacements, improvements and the like made within the principle of the present disclosure shall fall within the scope of protection of the present disclosure.

INDUSTRIAL APPLICABILITY

As described above, an eyeball tracking method based on light field sensing provided by the embodiments of the present disclosure has the following beneficial effects. Since only one of a left infrared light source and a right infrared light source is turned on in the same specific frame, mutual interference does not exist, and the problems that light rays emitted by light sources in binocular eyeball tracking easily interfere with each other and calculation result errors are large can be solved.

What is claimed is:

1. An eyeball tracking method for a virtual reality device, comprising:
presenting eyeball calibration data to eyes of a user through a display;
obtaining a binocular pupillary distance of the user by processing calibration data captured based on the eyeball calibration data;
capturing reflected infrared light of a turned on left infrared light source through a left tracking camera and capturing reflected infrared light of a turned on right infrared light source through a right tracking camera to form tracking data of one eye in each specific frame, and calculating tracking data of the other eye in the specific frame according to the binocular pupillary distance and the tracking data of one eye, wherein only one of the left infrared light source and the right infrared light source is turned on in the same specific frame; and
arranging the tracking data of one eye and the tracking data of the other eye according to a time sequence of the specific frame to form binocular tracking data so as to complete eyeball tracking.

2. The eyeball tracking method for the virtual reality device according to claim 1, wherein obtaining a binocular pupillary distance of the user by processing calibration data captured based on the eyeball calibration data comprises:
capturing, through a camera, an action of adjusting the eyes by the user according to the calibration data to obtain a user calibration image; and
positioning and analyzing the user calibration image to obtain a distance between centroids of the eyes of the user so as to generate the binocular pupillary distance.

3. The eyeball tracking method for the virtual reality device according to claim 1, wherein obtaining a binocular pupillary distance of the user by processing calibration data captured based on the eyeball calibration data comprises:
capturing, through the left tracking camera, an action of adjusting a left eye by the user according to the eyeball calibration data to form left eye calibration data, and capturing, through the right tracking camera, an action of adjusting a right eye by the user according to the eyeball calibration data to form right eye calibration data; and
fitting the left eye calibration data and the right eye calibration data according to a relative position relationship between the left tracking camera and the right tracking camera to obtain a distance between centroids of the eyes of the user so as to generate the binocular pupillary distance.

4. The eyeball tracking method for the virtual reality device according to claim 1, wherein capturing reflected infrared light of a turned on left infrared light source through a left tracking camera and capturing reflected infrared light of a turned on right infrared light source through a right tracking camera to form tracking data of one eye in each specific frame comprises:
controlling the left infrared light source and the right infrared light source to respectively emit infrared light to a left eye and a right eye of the user, so that the infrared light form reflected infrared light in the left eye and the right eye of the user; and
sequentially capturing the reflected infrared light according to a sequence of each specific frame and forming the tracking data of one eye in each specific frame according to a relative position of the reflected infrared light through a computer vision technology.

5. The eyeball tracking method for the virtual reality device according to claim 4, wherein the left infrared light source and the right infrared light source are sequentially and alternately turned on according to odd or even frame numbers of respective specific frames.

6. An eyeball tracking system for a virtual reality device, configured to implement the eyeball tracking method for the virtual reality device according to claim 1, comprising a display arranged in an integrated virtual reality device, a processor, monocular tracking modules and infrared light sources arranged in the integrated virtual reality device, wherein the monocular tracking modules comprise a left tracking camera and a right tracking camera, and the infrared light sources comprise a left infrared light source and a right infrared light source;
the display is configured to present eyeball calibration data to eyes of a user;
the processor is configured to obtain a binocular pupillary distance of the user;
the left tracking camera is configured to capture reflected infrared light of a turned on left infrared light source, and the right tracking camera is configured to capture reflected infrared light of a turned on right infrared light source to form tracking data of one eye in each specific frame, wherein only one of the left infrared light source and the right infrared light source is turned on in the same specific frame; and the processor is configured to calculate tracking data of the other eye in the specific frame according to the binocular pupillary distance and the tracking data of one eye, and further configured to arrange the tracking data of one eye and the tracking data of the other eye according to a time sequence of the specific frame to form binocular tracking data so as to complete eyeball tracking.

7. The eyeball tracking system for the virtual reality device according to claim 6, wherein
the left tracking camera and the right tracking camera are arranged at positions corresponding to a left eye and a right eye of the user in the integrated virtual reality device; and
the left infrared light source and the right infrared light source are respectively arranged on the periphery of the left tracking camera and the right tracking camera.

8. The eyeball tracking system for the virtual reality device according to claim 7, wherein
the left tracking camera is further configured to capture an action of adjusting the left eye by the user according to the eyeball calibration data to form left eye calibration data, and the right tracking camera is further configured to capture an action of adjusting the right eye by the user according to the eyeball calibration data to form right eye calibration data, so that the processor is configured to obtain the left eye calibration data and the right eye calibration data and fit the left eye calibration data and the right eye calibration data according to a relative position relationship between the left tracking camera and the right tracking camera to obtain a distance between centroids of the eyes of the user so as to generate the binocular pupillary distance.

9. The eyeball tracking system for the virtual reality device according to claim 7, further comprising a camera, wherein
the camera is configured to capture an action of adjusting the eyes by the user according to the calibration data to obtain a user calibration image, so that the processor is configured to position and analyze the user calibration image to obtain a distance between centroids of the eyes of the user so as to generate the binocular pupillary distance.

10. The eyeball tracking system for the virtual reality device according to claim 7, wherein
the left tracking camera and the right tracking camera have a capturing frame rate of 60 Hz.

11. A non-transitory computer-readable storage medium, having a computer program stored thereon which, when executed by a processor, implements the method according to claim 1.

12. An electronic device, comprising a memory and a processor, wherein the memory stores a computer program, and the processor is configured to execute the computer program to perform the method according to claim 1.

13. The eyeball tracking system for the virtual reality device according to claim 6, wherein
the left infrared light source and the right infrared light source are configured to respectively emit infrared light to a left eye and a right eye of the user, so that the infrared light form reflected infrared light in the left eye and the right eye of the user; and
the left tracking camera and the second tracking camera are configured to sequentially capture the reflected infrared light according to a sequence of each specific frame and form the tracking data of one eye in each specific frame according to a relative position of the reflected infrared light through a computer vision technology.

14. The eyeball tracking system for the virtual reality device according to claim 13, wherein
the left infrared light source and the right infrared light source are sequentially and alternately turned on according to odd or even frame numbers of respective specific frames.

15. A non-transitory computer-readable storage medium, having a computer program stored thereon which, when executed by a processor, implements the method according to claim 2.

16. A non-transitory computer-readable storage medium, having a computer program stored thereon which, when executed by a processor, implements the method according to claim 3.

17. A non-transitory computer-readable storage medium, having a computer program stored thereon which, when executed by a processor, implements the method according to claim 4.

18. A non-transitory computer-readable storage medium, having a computer program stored thereon which, when executed by a processor, implements the method according to claim 5.

19. An electronic device, comprising a memory and a processor, wherein the memory stores a computer program, and the processor is configured to execute the computer program to perform the method according to claim 2.

20. An electronic device, comprising a memory and a processor, wherein the memory stores a computer program, and the processor is configured to execute the computer program to perform the method according to claim 3.

* * * * *